March 19, 1963  C. W. WISE  3,081,574
FISHING DEVICES
Filed March 6, 1961
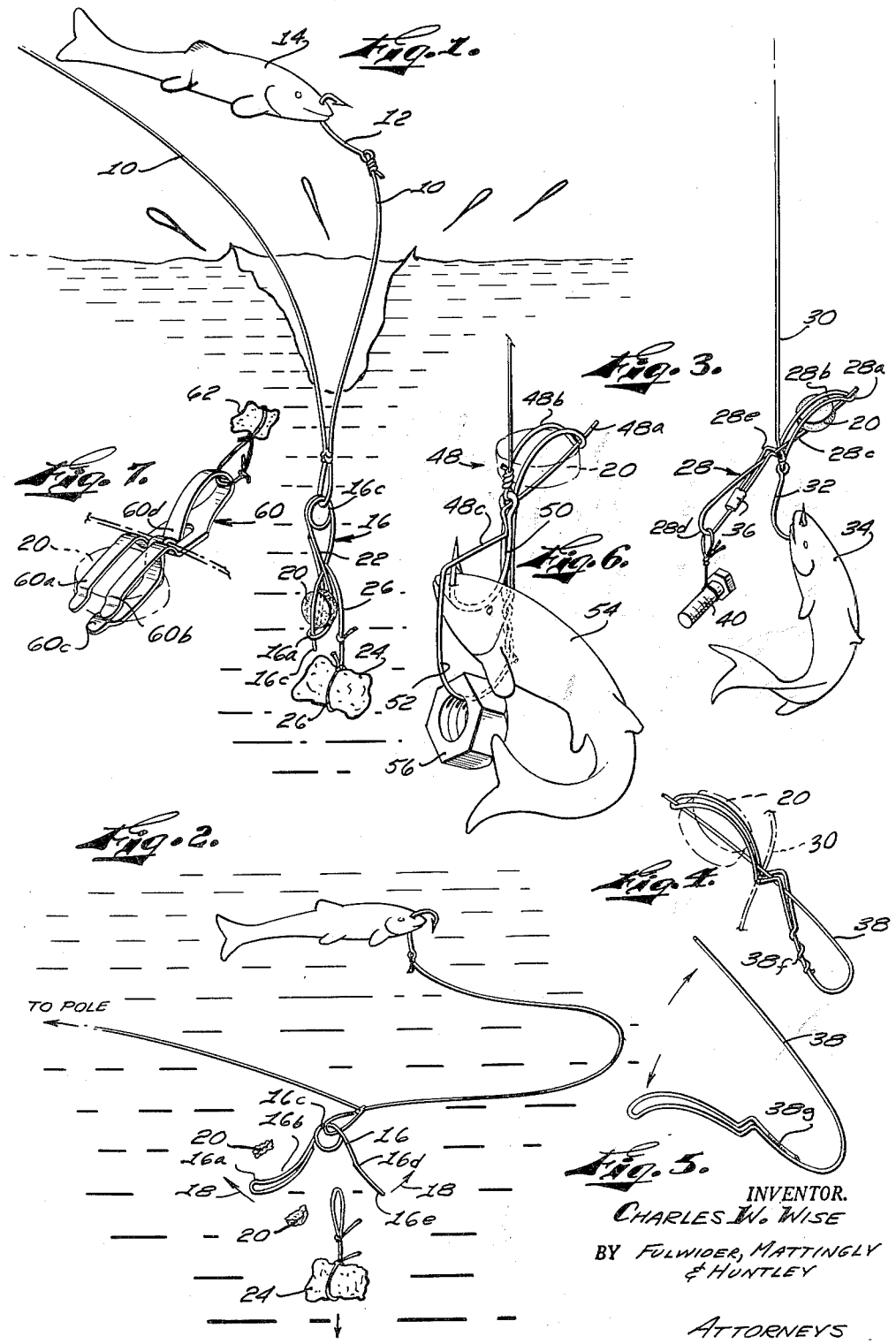
INVENTOR.
CHARLES W. WISE
BY FULWIDER, MATTINGLY
& HUNTLEY
ATTORNEYS

United States Patent Office 3,081,574
Patented Mar. 19, 1963

3,081,574
FISHING DEVICES
Charles W. Wise, 511 Eastwood, Santa Ana, Calif.
Filed Mar. 6, 1961, Ser. No. 93,508
8 Claims. (Cl. 43—43.12)

My present invention relates to fishing devices but more particularly to means for controlling a weight or sinker attached to a fish line.

Heretofore in the sport of fishing it has been extremely difficult, if not impossible, to position a bait attached to the end of a fish line in the most desired position with respect to a nearby school of fish. That is, particularly with the use of bait such as a live minnow or anchovy which are light in weight, it is difficult to cast far enough to where the sought-after school of fish is working. Conversely, if artificial weight is provided as by means of a sinker or other weight near the end of the line, the weight will, of course, facilitate the casting operation but will also carry the bait to the bottom of the lake or ocean, a condition which frequently is undesirable. That is, often the sought-after fish will be surface-feeding rather than working close to the bottom of the body of water, so that in order to have any success whatever it is necessary that the bait remain near the surface of the water. Thus, the use of a weight or sinker under such circumstances would be contrary to the desired effect.

Further, when using live bait such as minnows or anchovies, for optimum success it is necessary to permit the bait to act in a very natural manner after it has been positioned in close proximity to the school of fish. In this way it is much more attractive to the fish and hence functions more efficiently as a lure. This, of course, necessitates that the live bait be free of external forces as would be created by an artificial weight or sinker as it is acted upon by gravity. Thus, it is seen that the use of a weight to facilitate casting is further contrary to the desired effect to be obtained once the bait has entered the water.

In view of the foregoing it is an object of the present invention to provide means for releasing a weight or sinker from a fish line when the bait attached to such line is in the desired position within the water.

Another object of this invention is to provide weight releasing means for a sinker or the like which employs a water soluble capsule.

Another object is to provide weight releasing means for a fish line as characterized above which can be easily and quickly reloaded with another weight for subsequent use.

Another object of this invention is to provide weight releasing means for use with a fish line, such means being capable of retaining and releasing weights of a wide variety of sizes and shapes.

Another object of this invention is to provide weight releasing means for use with a fish line comprising a water soluble capsule which does not contaminate the fishing water or litter the surface thereof.

Another object of this invention is to provide weight releasing means as characterized above, which is attached to the weight and which releases itself from the fish line so that both the weight and the releasing means are free of the line.

Another object of this invention is to provide weight releasing means for a fish line as characterized above which is capable of utilizing scrap materials, such as nuts, bolts, pieces of stone or concrete or the like, whereby the loss upon release of the weight is substantially insignificant.

Another object is to provide weight releasing means as characterized above which can be so positioned as to substantially cover the end of the fish hook to render the latter substantially "weedless," and to prevent the bait from inadvertently slipping off.

Another object of this invention is to provide weight releasing means for a fish line which can be made from well-known resilient materials, such as spring steel or plastics.

Another object of this invention is to provide weight releasing means as characterized above which is simple and inexpensive to manufacture and rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a schematic view pictorially illustrating the use of a first embodiment of the present invention;

FIGURE 2 is a schematic view pictorially illustrating the releasing operation of the device of FIGURE 1;

FIGURE 3 is a perspective view of a second embodiment of the present invention;

FIGURE 4 is a perspective view of a modified form of the second embodiment of the present invention as shown in FIGURE 3;

FIGURE 5 is a perspective view of a further modification of the second embodiment of FIGURE 3, showing the releasing device in its open position;

FIGURE 6 is a perspective view of a fish hook comprising a third embodiment of the present invention; and FIGURE 7 is a form of the present invention similar to the second embodiment as shown in FIGURE 3.

Like reference numerals identify corresponding parts throughout the several views of the drawings.

Referring to FIGURE 1 of the drawings, there is shown therein a fish line 10 to which is attached a reversely bent barbed fish hook 12. A bait 14 which may take the form of an anchovy, minnow or the like is attached to hook 12 in a usual manner in which the hook is threaded through both the upper and lower jaws of the bait. Although not mandatory for successful operation of the instant invention, the weight releasing device to be hereinafter described in detail, is most useful in conjunction with live bait which depends on its natural movements and appearance in the water for attracting the sought-after fish.

Attached to fish line 10 at any desired distance from the hook 12 is a weight releasing device 16. It may be attached to line 10 in any desired manner as by forming a loop in the latter as shown in FIGURE 1. Device 16 is formed of resilient material such as flexible piano or music wire or the like.

The shape of device 16 is perhaps best shown in FIGURE 2. One end thereof is reversely bent as shown at 16a and is provided with a shallow bend as shown generally at 16b to provide a pad or platform for holding a water soluble capsule as will hereinafter be described in detail. The intermediate portion 16c of clip 16 is arranged in a circular fashion to utilize the inherent resiliency thereof to provide a torsional force acting on the opposite ends of the device. The other end 16e of clip 16 is provided with a slight bend as shown at 16d which cooperates with the pad or platform at 16b as will hereinafter be described. The reversely bent end portion of device 16 is fastened to the adjacent portion of clip 16 in any desired manner as by swedging, soldering, brazing, twisting or the like.

Clip 16 is so formed that the opposite ends thereof are urged away from each other by the torsional force indicated by the arrows 18 of FIGURE 2. Thus, in its natural condition, the clip 16 is open and incapable of retaining a sinker or weight of any kind. However, it is a simple matter to load or set the device merely by bringing together the ends 16a and 16e. A water soluble capsule 20 (FIGURE 1) which may take the form of a common aspirin tablet, salt tablet or the like, is then inserted between the ends 16a and 16e after they have been extended beyond their meeting positions. To facilitate this, the end 16e of clip 16 is inserted between the two portions of the pad or platform 16b. As shown in FIGURE 1, during the resetting operation capsule 20 is inserted between the ends 16a and 16e of the device and upon release of the latter the capsule is retained against the platform 16b by means of arm 16d by virtue of the biasing effect of the clip.

As shown in FIGURE 1, resetting of clip 16 provides a closed loop 22 through which a sinker or weight 24 can be fastened to clip 16 as by a string or cord as shown at 26. The weight 24 can be any expendable object of the appropriate size and weight to facilitate the proper "feel" for the fisherman casting the bait to enable him to cast it into the proper position.

As soon as the capsule 20 enters the water, it will begin to dissolve, and when it is no longer strong enough to retard the torsional spring force of clip 16, the ends 16a and 16e thereof will separate into the position of FIGURE 2. This will cause the loop 22 to be opened and the weight 24 will fall free of the fish line 10. It is contemplated within the scope of the instant invention capsules 20 having different solubility rates in water may be used to provide control over the moment at which the weight would be released. This will enable the fisherman to position the bait at any desired position within the body of water. This would be obtained, of course, due to the fact that until the weight 24 is released from clip 16 it will carry the line 10 and bait 14 toward the bottom of the body of water being fished.

Referring to FIGURE 3 of the drawings, there is shown therein a second embodiment for illustration of the present invention. Whereas the clip 16 of FIGURES 1 and 2 is firmly secured to fish line 10 and merely releases the weight at a predetermined moment, the clip 28 of FIGURE 3 is constructed such as to detach itself from the fish line at the appropriate time.

FIGURE 3 shows a fish line 30 to which is attached a fish hook 32 carrying bait 34. Clip 28 is provided with a reverse bend 28a which is arcuately formed as at 28b to provide a pad or platform not unlike that shown at 16b with respect to clip 16 of FIGURES 1 and 2. The opposite end portion of clip 28 is also formed with a modified curve as at 28c for cooperating with platform 28b for retaining a water soluble capsule 20 as shown. Clip 28 is formed of resilient wire so that the bend as shown at 28d biases the opposite ends of clip 28 to separated relative positions. The reversely bent portion of clip 28 is fastened to the adjacent portion of clip 28 by any desired means as by swedging as shown in FIGURE 3 at 36.

The reversely bent portion of clip 28 is provided with a pair of reverse right angle bends to provide a knee as at 28e. In this manner, there is provided means for fastening clip 28 to the fish line 30 as by gripping such line between the opposite ends of clip 28 when the device is reset as shown in FIGURE 3.

Upon dissolution of capsule 20, the torsional force afforded by bend 28d of clip 28 opens said clip and permits the latter to fall free of fish line 30, carrying with it weight 40. In this manner, the live bait 34 is free to swim about and thereby lure the fish being sought.

The forms of the invention shown in FIGURES 4 and 5 differ from the second embodiment shown in FIGURE 3 only with regard to the way in which the reversely bent end portion of the clip is fastened to the main body portion thereof. That is, whereas in FIGURE 3 such connection was effected by swedging as illustrated at 36, in FIGURE 4 the connection is shown as being accomplished by twisting the end portion 38f about the main body portion of device 38. FIGURE 5, on the other hand, shows such connection as being made by soldering the two members together as at 38g.

The third embodiment as shown in FIGURE 6 of the drawings, discloses a clip 48 wherein the end portion 48a not only cooperates with a pad or platform 48b to retain the water soluble capsule in its reset position as above explained with respect to the other embodiments, but it also extends through the eye of the fish hook 50 to thereby attach it thereto. The releasable loop 52 of clip 48 is provided with a substantially straight portion 48c which extends from the barb of hook 50 to the shank thereof so as to effectively prevent the bait, as illustrated at 54, from inadvertently being removed therefrom. Also, the portion 48c of clip 48 effectively prevents the hook 50 from accidentally engaging weeds or logs or other obstacles which are found in fishing waters and constitute a menace to the fishermen. In other words, the portion 48c also functions to make the resulting device "weedless."

When clip 48 is released upon dissolution of the capsule associated therewith, the opposite ends 48a and 48b thereof are separated thereby enabling weight 56 to remove end portion 48a of clip 48 from within the eye of hook 50. Thus, the weight and the entire clip 48 are free of the line, whereupon the bait 54 is able to act in a very natural manner.

The form of the invention shown in FIGURE 7 is not too unlike the second embodiment shown in FIGURE 3 and hereinbefore described in considerable detail. However, the device 60 of FIGURE 7 is formed of sheet material, as for instance sheet steel or sheet plastic. One end of clip 60 is bifurcated to provide a pair of arms 60a and 60b which cooperate with the opposite end 60c of clip 60 to provide retaining means for a water soluble capsule 20. The main body portion 60d of clip 60 is provided with an S-shape to provide means for firmly gripping a fish line whenever the device 60 is reset as shown in FIGURE 7. Upon dissolution of the capsule 20 retained thereby, device 60 releases the fish line and enables a weight 62 to fall free for purposes as above described with respect to the other embodiments of the instant invention.

It will be noted that each of the disclosed embodiments of the present invention is characterized by having a pair of generally oppositely S-shaped end portions which are joined together by an intermediate flexible portion. As such, complementally shaped portions of such S-shaped end portions afford means for retaining a water-soluble capsule to thus provide an endless loop for retaining a predetermined weight.

It is thus seen that the present invention affords means whereby a predetermined weight can be attached to a fish line to facilitate the casting operation, such means releasing said weight at the proper time to position the bait at the right height within the body of water being fished and to enable the bait to provide its natural action.

Although I have shown and described certain specific embodiments of my invention, I am fully aware that many modifications thereof are possible. The invention itself therefore is not to be restricted except insofar as is necessitated by the prior art and by the spirit of the appended claims.

I claim:

1. An article of fishing tackle for detachably securing a weight to a fish line, comprising: a clip attachable to said fish line and formed of spring steel having at one end a tablet-receiving pad formed with an opening and an arm at the other end joined by an intermediate resilient portion pivotally biasing said pad and arm toward separated relative positions, and a water-soluble tablet positioned on said pad and retained thereon upon release of said arm after manual resetting thereof through the opening in said pad beyond the position thereof against the biasing force of said intermediate portion, said resetting of said clip clamping it to said line and providing a closed loop for attachment to an expendable weight, whereby dissolution of said tablet permits said intermediate portion to return said pad and arm to said separated relative positions to thereby release said clip and said weight.

2. An article of fishing tackle according to claim 1 wherein said clip is formed of resilient wire, said capsule-receiving pad being formed of a reversely bent end portion thereof.

3. An article of fishing tackle according to claim 2 wherein upon resetting said arm is positioned between the reversely bent portions of said capsule-receiving pad to firmly retain said tablet in its reset position.

4. An article of fishing tackle for detachably securing a weight to a fish line, comprising: a clip attachable to said fish line and formed with a pair of oppositely S-shaped end portions joined by an intermediate portion for biasing said end portions toward separated relative positions, one of said end portions being formed with an aperture for receiving the other of said end portions, and a water-soluble tablet insertable within an opening formed by said end portions when the latter are moved beyond each other after insertion of said other of said end portions in said aperture in said one end portion against the biasing force of said intermediate portion, such movement of said end portions causing said clip to clampingly engage said fish line and also providing an endless loop for attachment of an expendable weight, dissolution of said tablet permitting said intermediate portion to return said opposite end portions to their separated relative positions to thereby release said clip and said weight.

5. An article of fishing tackle for detachably securing a weight to a fish line, comprising: a clip formed with a pair of opposite end portions joined by an intermediate resilient portion for biasing said end portions toward separated relative positions, one of said end portions being formed with an aperture for receiving the other end portion, and water-soluble means for retaining said opposite end portions together after insertion of said other end portion in the aperture in said one end portion against the biasing force of said intermediate portion to grip said fish line and to provide an endless loop for retaining a weight, dissolution of said water-soluble means permitting said intermediate portion to return said opposite end portions to their separated relative positions and thereby to release said clip from said fish line for removal therefrom of said weight.

6. An article of fishing tackle according to claim 5 wherein said clip is formed of resilient wire.

7. An article of fishing tackle according to claim 5 wherein said clip is formed of resilient plastic.

8. An article of fishing tackle for detachably securing a weight to a fish line, comprising: a clip having at one end a capsule-receiving pad formed with an opening and an arm at the other end joined by an intermediate resilient portion pivotally biasing said pad and arm toward separated relative positions, and a water-soluble capsule positioned on said pad and retained thereon by said arm upon resetting thereof through the opening in said pad against the biasing force of said intermediate portion, said resetting of said clip causing the latter to grip said fish line and providing a closed loop for retaining a weight, whereby dissolution of said capsule causes said intermediate portion to return said pad and arm to said separated relative positions to thereby release said clip from said fish line and to open said loop for release of said weight.

References Cited in the file of this patent

UNITED STATES PATENTS

| | | |
|---|---|---|
| 1,559,886 | Kipke | Nov. 3, 1925 |
| 1,684,461 | Butner | Aug. 21, 1928 |
| 2,947,052 | Michalsky | Aug. 2, 1960 |
| 2,988,395 | Rogers | June 13, 1961 |

FOREIGN PATENTS

| | | |
|---|---|---|
| 579,591 | France | Aug. 6, 1924 |